United States Patent
Luppi

(10) Patent No.: US 9,217,517 B2
(45) Date of Patent: Dec. 22, 2015

(54) METHOD FOR THE ASSISTED INSTALLATION OF AN UNDERWATER RISER

(75) Inventor: Ange Luppi, Nîmes (FR)

(73) Assignee: TECHNIP FRANCE (FR)

(*) Notice: Subject to any disclaimer, the term of this patent is extended or adjusted under 35 U.S.C. 154(b) by 0 days.

(21) Appl. No.: 14/006,836

(22) PCT Filed: Mar. 15, 2012

(86) PCT No.: PCT/FR2012/050549
§ 371 (c)(1),
(2), (4) Date: Oct. 17, 2013

(87) PCT Pub. No.: WO2012/127157
PCT Pub. Date: Sep. 27, 2012

(65) Prior Publication Data
US 2014/0037385 A1    Feb. 6, 2014

(30) Foreign Application Priority Data
Mar. 23, 2011 (FR) .................... 11 52387

(51) Int. Cl.
*F16L 1/14* (2006.01)
*F16L 1/15* (2006.01)
*E21B 17/01* (2006.01)
(Continued)

(52) U.S. Cl.
CPC .............. *F16L 1/15* (2013.01); *E21B 17/012* (2013.01); *E21B 17/015* (2013.01); *E21B 43/013* (2013.01); *E21B 43/0107* (2013.01); *E21B 43/0135* (2013.01)

(58) Field of Classification Search
CPC .................................................. E21B 17/012
USPC ........... 405/168.3, 166, 158, 168.1, 171, 172; 166/350, 367
See application file for complete search history.

(56) References Cited

U.S. PATENT DOCUMENTS

| 6,082,391 | A  | * | 7/2000 | Thiebaud et al. | .......... 137/236.1 |
| 7,073,593 | B2 | * | 7/2006 | Hatton et al.   | .................. 166/367 |
| 2005/0109513 | A1 |  | 5/2005 | Dailey et al.   | |

(Continued)

FOREIGN PATENT DOCUMENTS

| FR | 2 927 651 | 8/2009 |
| FR | 2 938 001 | 5/2010 |

(Continued)

OTHER PUBLICATIONS

International Search Report and Written Opinion dated Jun. 11, 2012 issued in International patent application No. PCT/FR2012/050549.

(Continued)

*Primary Examiner* — Sean Andrish
(74) *Attorney, Agent, or Firm* — Ostrolenk Faber LLP

(57) ABSTRACT

A method for installing an underwater riser between a seabed (52) and a surface (12), and a tubular pipe suspended from a float (24): The float (24) is weighted to be able to submerge it to drive one pipe end (28) toward the seabed (52) for connecting the tubular pipe at the seabed. Unwinding the flexible pipe (20) to extend it catenary fashion between the float (24) and a surface installation (10) so as to weight the float (24) with the unwound flexible pipe (20) and cause the submersion of the float (24), whereby the other pipe end (28) is driven toward the seabed (52).

10 Claims, 3 Drawing Sheets

(51) Int. Cl.
*E21B 43/01* (2006.01)
*E21B 43/013* (2006.01)

(56) References Cited

U.S. PATENT DOCUMENTS

| | | |
|---|---|---|
| 2007/0048093 A1 | 3/2007 | Bhat et al. |
| 2007/0081862 A1* | 4/2007 | Wolbers et al. ............... 405/169 |
| 2008/0223583 A1* | 9/2008 | Roveri et al. ................. 166/336 |
| 2010/0209197 A1 | 8/2010 | Luppi |
| 2011/0020067 A1* | 1/2011 | Espinasse et al. ............ 405/166 |

FOREIGN PATENT DOCUMENTS

| | | |
|---|---|---|
| WO | WO 2010/007225 A1 | 1/2010 |
| WO | WO 2010/052422 A2 | 5/2010 |
| WO | WO 2011/028432 * | 3/2011 |

OTHER PUBLICATIONS

Jeroen Remery et al.: "The Free Standing Flexible Riser: A Novel Riser System for an Optimised Installation Process", Offshore Technology Conference, May 5, 2008, pp. 1-11, XP007918877.

* cited by examiner

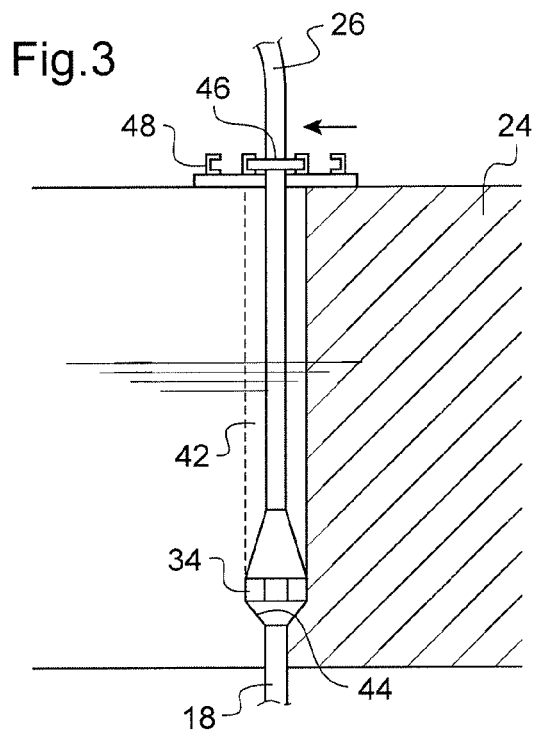
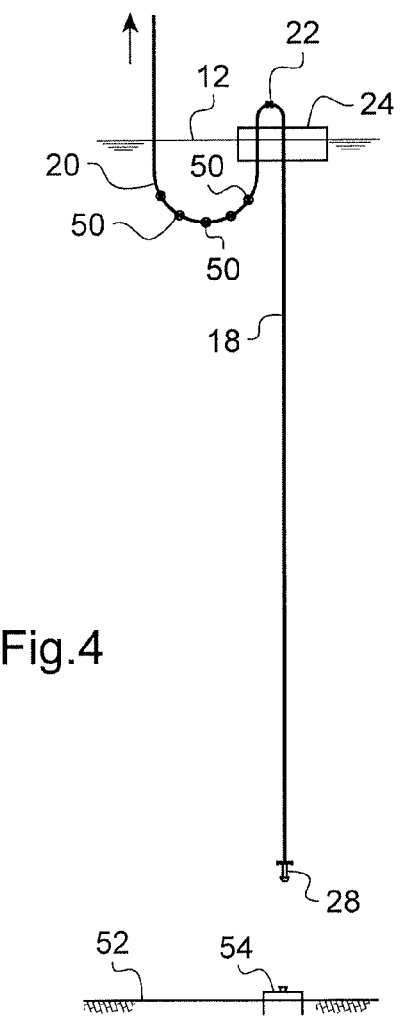

METHOD FOR THE ASSISTED INSTALLATION OF AN UNDERWATER RISER

CROSS-REFERENCE TO RELATED APPLICATIONS

The present application is a 35 U.S.C. §§371 national phase conversion of PCT/FR2012/050549, filed Mar. 15, 2012, which claims priority of French Application No. 1152387, filed Mar. 23, 2011, the contents of which are incorporated by reference herein. The PCT International Application was published in the French language.

BACKGROUND OF THE INVENTION

The present invention relates to a method for installing an underwater riser, or vertical tower, to transport hydrocarbons between the seabed and a surface of the water.

Underwater risers are known and they are installed between a bottom installation situated close to a well and a surface installation situated substantially vertically above the bottom installation. They mainly comprise, on the one hand, a vertical tubular pipe, flexible or else rigid, which extends from the bottom installation to a subsurface level where it is retained by means of a float, and, on the other hand, a flexible pipe connected to the tubular pipe at the level of the float and which extends from the float to join the surface installation. The normative documents API-RP-17B show underwater risers consisting only of flexible pipes. So-called "hybrid tower" risers, in which the vertical tubular pipe is a rigid pipe, are also implemented.

The float is generally installed well below the surface, in an area where the movements of the water are smaller compared to those of the surface. The tubular pipe has a bottom end connected to the bottom installation and a top end held through the float and connected to the flexible pipe. Thus, the hydrocarbon can be raised from the bottom installation to the surface installation through the vertical pipe and the flexible pipe.

Given the weight of the elements present, and the marine environment, the installation of these underwater risers is costly in terms of time and energy. Furthermore, the precise adjustment of the bottom end of the vertical tubular pipe on the bottom installation is difficult precisely because of the surface movements.

Also, in the interests of freedom from said surface movements, consideration has been given, on the one hand, to flooding the float to submerge it with the tubular pipe and, on the other hand, to installing a pulling cable at said bottom end of the pipe, to engaging this cable in return means situated on the bottom installation and to pulling it by means of another float submerged below the surface, so as to drive the bottom end toward the bottom installation. For this, the flooded float is gradually emptied to take up the pulling forces of the cable and to accurately adjust the bottom end on the bottom installation. The adjustment of the relative position of the two floats which is performed below the moving surface is easier and, consequently, the connection of the bottom end to the bottom installation is performed in better conditions.

Reference can be made to the document FR 2 927 651, which describes such an installation method.

However, in some installation conditions, and in particular when great water depths are involved, the tubular pipe is relatively long and the float is consequently more bulky. Also, their handling requires crane handling means that are adapted accordingly and relatively heavy for the surface installations.

Also, one problem which arises and that the present invention aims to resolve, is how to provide an underwater riser installation method that does not require particular additional installation means and that nevertheless makes it possible to install very long tubular pipes and their associated float.

SUMMARY OF THE INVENTION

To this end, the present invention proposes a method for installing an underwater riser to transport hydrocarbons between a seabed and a sea surface, said method being of the type whereby: a surface installation and a float suitable for floating on said sea surface are provided; a tubular pipe is provided that has two opposite ends, and said tubular pipe is suspended from said float by one of said two pipe ends, while said tubular pipe extends toward said seabed; a flexible pipe is provided to link said float and said surface installation, said flexible pipe being connected to said one of said tubular pipe ends and then, said float is weighted to submerge it and drive said other pipe end toward said seabed so as to be able to connect said other pipe end in said seabed. According to the invention, said flexible pipe is unwound from said surface installation to extend it catenary-fashion between said float and said surface installation so as to weight said float with said unwound flexible pipe and provoke the submersion of said float, whereby said other pipe end is driven toward said seabed.

Thus, one feature of the invention lies in the implementation of the flexible pipe to weight the float and the tubular pipe and adjust and connect the other pipe end, that is the bottom end, in said seabed. The float is dimensioned according to the weight of the tubular pipe so that, in equilibrium, the latter can be held suspended vertically in the water. By virtue of the flexible pipe, which is advantageously unwound between said float and said seabed to weight said float, the equilibrium is broken, and the specific weight of the flexible pipe drives the float, and consequently the tubular pipe, toward the seabed. The greater the length of flexible pipe unwound under the float, toward the seabed, the more the float is weighted. When the bottom end approaches the seabed, the unwinding of said flexible pipe is stopped to halt the descent as will be explained in more detail hereinafter in the description. Thus, the vertical position of the float is much less dependent on the movements of the surface installation, which oscillates about an equilibrium position. In addition, the float and the tubular pipe are substantially in equilibrium and do not need to be retained by significant crane handling means.

Moreover and according to a particular implementation, said flexible pipe is flooded to increase the weight of said unwound flexible pipe and consequently weight it even more. According to another particular implementation, ballasts are provided with which said flexible pipe is equipped to increase the weight of said unwound flexible pipe and, once again, to increase the weight. In this way, the submersion of the float is easier and, above all, faster.

Preferentially, said flexible pipe and said one of said tubular pipe ends are connected before suspending said tubular pipe from said float. This connection is done on the surface, for example on the surface installation, in the open air, which is obviously easier than in water. Advantageously, the flexible pipe is connected to the tubular pipe via a swan-neck rigid part, and this rigid part is suspended from crane handling means situated on the surface installation to maneuver both the rigid pipe and the flexible pipe.

Furthermore, a float is provided that is preferably of generally cylindrical form with having a height and a diameter of which the fraction is less than 1.5. This means that the float firstly exhibits a better stability compared to the longitudinal floats, which is an advantage for the towing to the place of installation. Then, such a float makes it possible, in certain installation circumstances, to connect the tubular pipe and the flexible pipe above said float and consequently above the surface.

Also, and according to a particularly advantageous feature of the invention, a float is provided that has a radial slot opening on the outside of said float, and said one of said tubular pipe ends is driven laterally through said radial slot to suspend said tubular pipe from said float. When the rigid pipe is suspended from the crane handling means via the swan-neck rigid part, it can be borne through the radial slot by actuating the crane handling means in such a way as to be able to hook said one of said two opposite ends, that is the top end, to the float. This attachment method will be explained in more detail hereinbelow in the description.

According to a variant embodiment of the invention, a flexible tubular pipe is provided. This choice is guided, for example, by the need to equip the annulus of the pipe with energy supply means, heating means or even means for transporting gas through umbilicals. In this case, it is advantageous to fill said tubular pipe with a pressurized gas and to connect said flexible tubular pipe with said float to keep said float under hydrostatic pressure during its descent. In this way, on the one hand, the "reverse end cap effect", which, at great depth, causes a local partial destruction of the structure of the pipe, is avoided. On the other hand, the crushing of the float is avoided by keeping it under pressure.

In addition, a bottom installation is provided, situated on said seabed to receive said other pipe end and a pulling cable is also provided together with return means for said pulling cable, said return means being mounted on said bottom installation, whereas said pulling cable is, on the one hand, attached to said other pipe end and, on the other hand, engaged through said return means to be able to be drawn toward the surface. In this way, when the bottom end of the tubular pipe is approaching the bottom installation, by exerting a pulling force on the pulling cable, the bottom end is guided toward connection means. At the same time, the flexible pipe is raised in order to progressively unload the float and avoid having the bottom tubular pipe end strike the seabed or the bottom installation.

BRIEF DESCRIPTION OF THE DRAWINGS

Other features and advantages of the invention will emerge on reading the following description of a particular embodiment of the invention, given as an indication, but nonlimiting, with reference to the attached drawings in which:

FIG. 3 is a detail schematic view of an element of the underwater riser;

FIG. 4 is a partial schematic side view showing an underwater riser in a second installation phase;

DESCRIPTION OF AN EMBODIMENT

Figure 1:
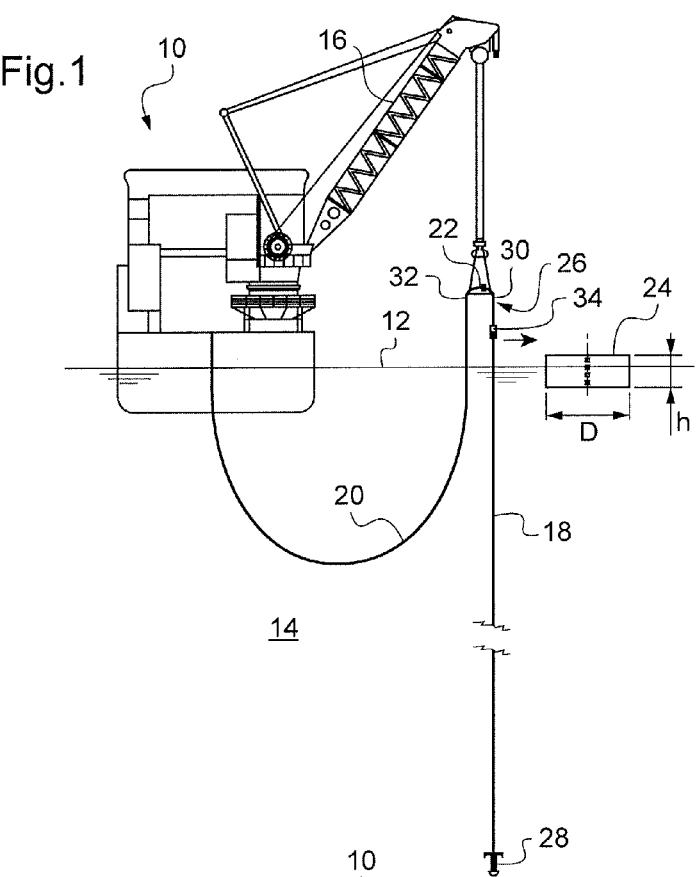
FIG. 1 is a partial schematic side view of a surface installation with which to implement the installation method according to the invention, in a first phase.

FIG. 1 illustrates a surface installation 10 floating on the surface 12 of a marine environment 14. The surface installation 10 is equipped with a crane 16 from which is suspended a tubular pipe 18 and a flexible pipe 20 via a swan-neck rigid part 22 which connects them. The tubular pipe 18, the flexible pipe 20 and the swan-neck rigid part 22 are advantageously joined together in the open air on the surface installation. Furthermore, in the vicinity of the surface installation 10, a float 24 floats, said float having a substantially cylindrical symmetry of which the ratio, height h to diameter D, is advantageously less than 1.5, for example 0.5. This type of float 24, or flat buoy, especially presents the advantage of offering a great stability, compared to the longitudinal buoys, when it is towed to the installation site. It offers other advantages that will be explained below after having described the tubular pipe 18 and the flexible pipe 20 more specifically.

The tubular pipe 18 is here a flexible pipe and it has a top end 26 and, opposite, a bottom end 28. It is held suspended from the swan-neck rigid part 22 by its top end 26. The swan-neck rigid part 22 comprises a curved pipe having an inlet end 30 to which the top end 26 is connected, and, opposite, an outlet end 32 to which the flexible pipe 20 is connected. The swan-neck rigid part 22 is intended to ensure the transfer of a hydrocarbon circulating in the tubular pipe 18 to the flexible pipe 20. It is held above the surface 12 using the crane 16, whereas the flexible pipe 20 extends catenary-fashion between the swan-neck rigid part 22 and the surface installation 10. Only a part of the flexible pipe 20 is here extended catenary-fashion, whereas the other part is stored and preferably wound on the surface installation 10. The flexible pipe 20 is heavy and that is why, in water, it thus extends catenary-fashion.

Furthermore, the tubular pipe 18 has, close to its top end 26, a circular stop member 34 which extends radially around the pipe. This circular stop member 34 makes it possible to suspend the tubular pipe 18 from the float 24 as will be explained hereinbelow.

Figure 2:
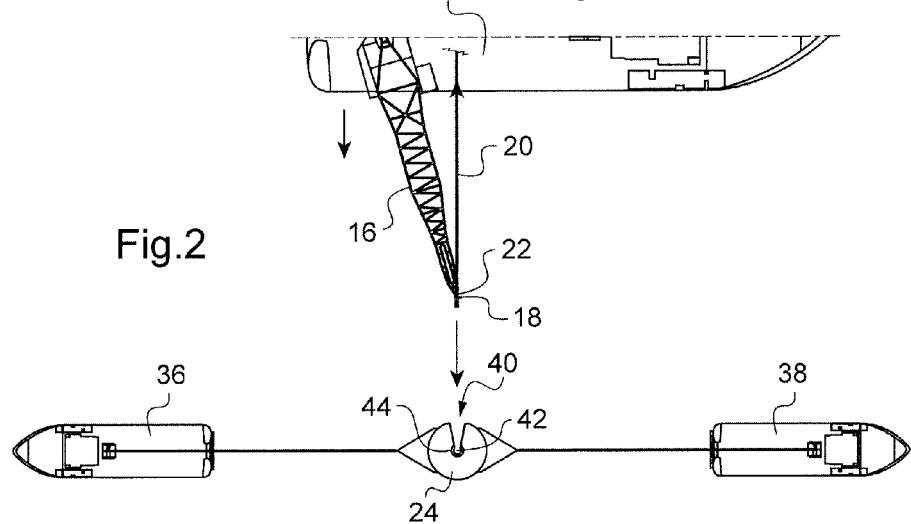
FIG. 2 is a partial schematic plan view of the installation illustrated in FIG. 1.

FIG. 2 again shows, partially in plan view, the surface installation 10 equipped with its crane 16 and the float 24 guided by two tug boats 36, 38 which act in diametrically opposite directions, so as to be able to keep it in a relatively fixed position relative to the surface installation 10. The float 24 has a radial slot 40 which opens on the outside and through which the tubular pipe 18 will be guided using the crane 16 and the tug boats 36, 38. Furthermore, the float 24 has an axial housing 42 passing through it from side to side and into which the radial slot 40 opens. In addition, the axial housing 42 has, in its bottom part, a shoulder 44 that shrinks it. The axial housing 42 has, up to the shoulder 44, a diameter greater than or equal to that of the abovementioned circular stop member 34, whereas, beyond the shoulder 44, the diameter of the axial housing 42 is less than that of the stop member 34.

Thus, after the tubular pipe 18 has been brought through the radial slot 40 and then into the axial housing 42, by having taken care to ensure that the circular stop member 34 is situated above the float 24, the lowering of the tubular pipe 18 is then provoked, and the circular stop member 34 is then engaged inside the axial housing 42 to bear on the shoulder 44 as illustrated in detail in FIG. 3.

This figure again shows the float 24 with its axial housing 42 and its shoulder 44 whereas the circular stop member 34, engaged in the axial housing 42, is bearing specifically on the shoulder 44. In this way, all of the weight of the tubular pipe 18 is taken up by the float 24. It is also necessary for, in equilibrium, the float 24 to ensure the suspension of the tubular pipe 18, so that, when submerged, the float 24 can exert a vertical force on the tubular pipe 18 so as to hold it substantially vertically. In order to adjust the buoyancy of the float 24, floodable ballasting compartments are provided, that make it possible, in particular when the buoyancy is too great relative to the weight of the tubular pipe 18, to reduce it significantly.

Furthermore, the tubular pipe 18 comprises, between the circular stop member 34 and the top end 26, a locking ring 46, while the float 24 has a locking member 48 inside which the locking ring 46 can be locked. In this way, the tubular pipe 18 is immobilized in translation relative to the float 24. It will be observed that the operations of locking or adjusting the tubular pipe 18 on the swan-neck rigid part 22 can be performed above the float 24 in the open air before it is submerged.

The crane 16 and the swan-neck rigid part 22 are then separated while the float 24 is linked to the surface installation 10 via the flexible pipe 20. The float 24 floats on the surface of the water 12 while the bottom end 28 of the tubular pipe 18 is free and is situated at a distance from the seabed.

FIG. 4 shows this relative position of the float 24 to the surface 12 of the water and of the suspended tubular pipe 18 as well as the catenary flexible pipe 20. Furthermore, the latter is equipped with ballasts 50, comprising heavy weights mounted like string beads on the flexible pipe 20. This FIG. 4 also shows a seabed 52 and a bottom installation 54 situated vertically below the float 24. The latter will then be submerged and pressed down in the water by unwinding, or dereeling, the flexible pipe 20 prewound on the surface installation. In practice, by unwinding the flexible pipe 20, which, independently of the ballast is itself heavy, the float 24 is subjected to a weight which increases progressively, and which then provokes the descent of the float 24 and of the tubular pipe 18. The flexible pipe 20 can also be flooded in order to increase its weight and more effectively further load the float 24.

Figure 5:
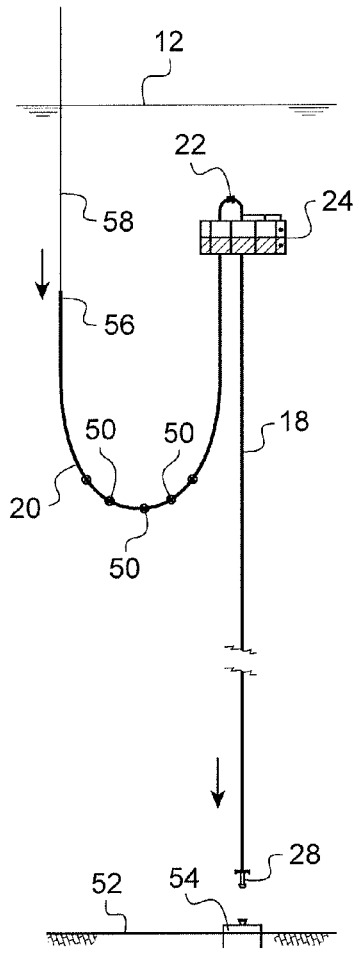
FIG. 5 is a partial schematic side view showing an underwater riser in a third installation phase; and, FIG. 6 is a partial schematic side view showing an underwater riser in a fourth installation phase.

Reference will now be made to FIG. 5, where the float is submerged and where a significant length of flexible pipe 20 extends catenary-fashion between the surface 12 and the float 24 and where, above all, a significant quantity of flexible pipe 20 extends below the float 24 in order to load it. It will be observed that the flexible pipe 20, unlike the float 24, has an end 56 taken up by a sling 58, which is in turn linked to the surface installation which is not represented in this figure. Consequently, the float 24 and the tubular pipe 18 are driven progressively toward the seabed 52 and the bottom end 28 of the tubular pipe 18 is then also driven in translation toward the seabed 52, and thereby toward the bottom installation 54.

Thus, the descent of the tubular pipe 18 and of the float and the approach of the tubular pipe end 28 toward the bottom installation 54 are controlled by the quantity of flexible pipe unwound. In particular, when the bottom end 28 approaches the seabed 52, the unwinding of the flexible pipe 20 is stopped.

Moreover, the float 24 is advantageously equipped with a sealed compartment filled with an inert gas and this compartment is linked to the tubular pipe 18, which is, in this case, flexible and which is itself filled with inert gas, so as to be able to keep the float 24 at the hydrostatic pressure and also avoid its crushing during the descent. In practice, the flexible tubular pipe 18 can withstand pressures, for example, of 100-200 bar whereas the float 24 cannot be exposed to pressures greater than approximately 5 bar without the risk of explosion.

Figure 6:
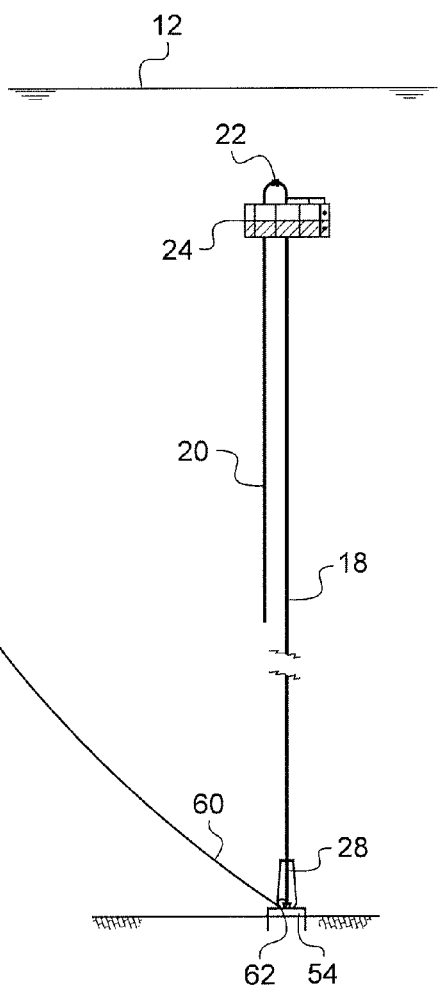

Furthermore, as illustrated in FIG. 6, the bottom end 28 of the tubular pipe 18 is attached to a pulling cable 60 which is engaged in return means 62 mounted on the bottom installation 54 and is extended beyond toward the surface 12 so as to be able to be pulled from the surface installation or any other surface vessel. In this way, the bottom end 28 is accurately guided and driven toward the bottom installation 54. During the latter operation, the flexible pipe 20 can be detached from the surface installation.

Preferably, safety slings link the foundation 54 to the tubular pipe bottom end 28. They make it possible to keep the device under the water should the pulling cable break.

The invention claimed is:

1. A method for installing an underwater riser to transport hydrocarbons between a seabed and a sea surface, the method comprising:
   in the following order,
   providing a surface installation, providing a float suitable for floating on said sea surface;
   providing a tubular pipe that has two opposite ends;
   suspending said tubular pipe from said float by one of said two pipe ends, while said suspended tubular pipe extends toward said seabed;
   providing a flexible pipe at said surface installation;
   linking said float and said surface installation with said flexible pipe by connecting said flexible pipe to said one of said tubular pipe ends;
   simultaneously, driving the other of said two pipe ends toward said seabed and submerging said float from said sea surface to below said sea surface by selectively unwinding said flexible pipe from said surface installation to extend said flexible pipe in a catenary fashion between said float and said surface installation to weigh down said float with said unwound flexible pipe to cause said submerging of said float and to drive the other of said two pipe ends towards said seabed; and
   connecting the other of said two pipe ends to the bottom installation at said seabed.

2. The installation method as claimed in claim 1, further comprising unwinding said flexible pipe between said float and said seabed to weight said float.

3. The installation method as claimed in claim 1, further comprising flooding said flexible pipe to increase the weight of said unwound flexible pipe.

4. The installation method as claimed in claim 1, further comprising providing at least one ballast on said flexible pipe to increase the weight of said unwound flexible pipe.

5. The installation method as claimed in claim 1, further comprising connecting said flexible pipe and said one of said tubular pipe ends before suspending said tubular pipe from said float.

6. The installation method as claimed in claim 1, wherein said float is of circular cylindrical form and having a height h and a diameter D, the ratio of height h to diameter D being less than 1.5.

7. The installation method as claimed in claim 6, wherein said float includes a radial slot, and the method comprises driving said one of said tubular pipe ends laterally through said radial slot for suspending said tubular pipe from said float.

8. The installation method as claimed in claim 1, wherein said tubular pipe is flexible.

9. The installation method as claimed in claim 8, further comprising connecting said flexible tubular pipe with said float to keep said float under hydrostatic pressure.

10. The installation method as claimed in claim 1, further comprising providing a bottom installation on said seabed to receive said other pipe end, providing a pulling cable together with a mounting return device for said pulling cable, mounting said return device on said bottom installation, attaching said pulling cable to said other pipe end and engaging said pulling cable through said return device.

* * * * *